(No Model.)
L. D. HOWARD.
CHAIN.
No. 574,906. Patented Jan. 12, 1897.
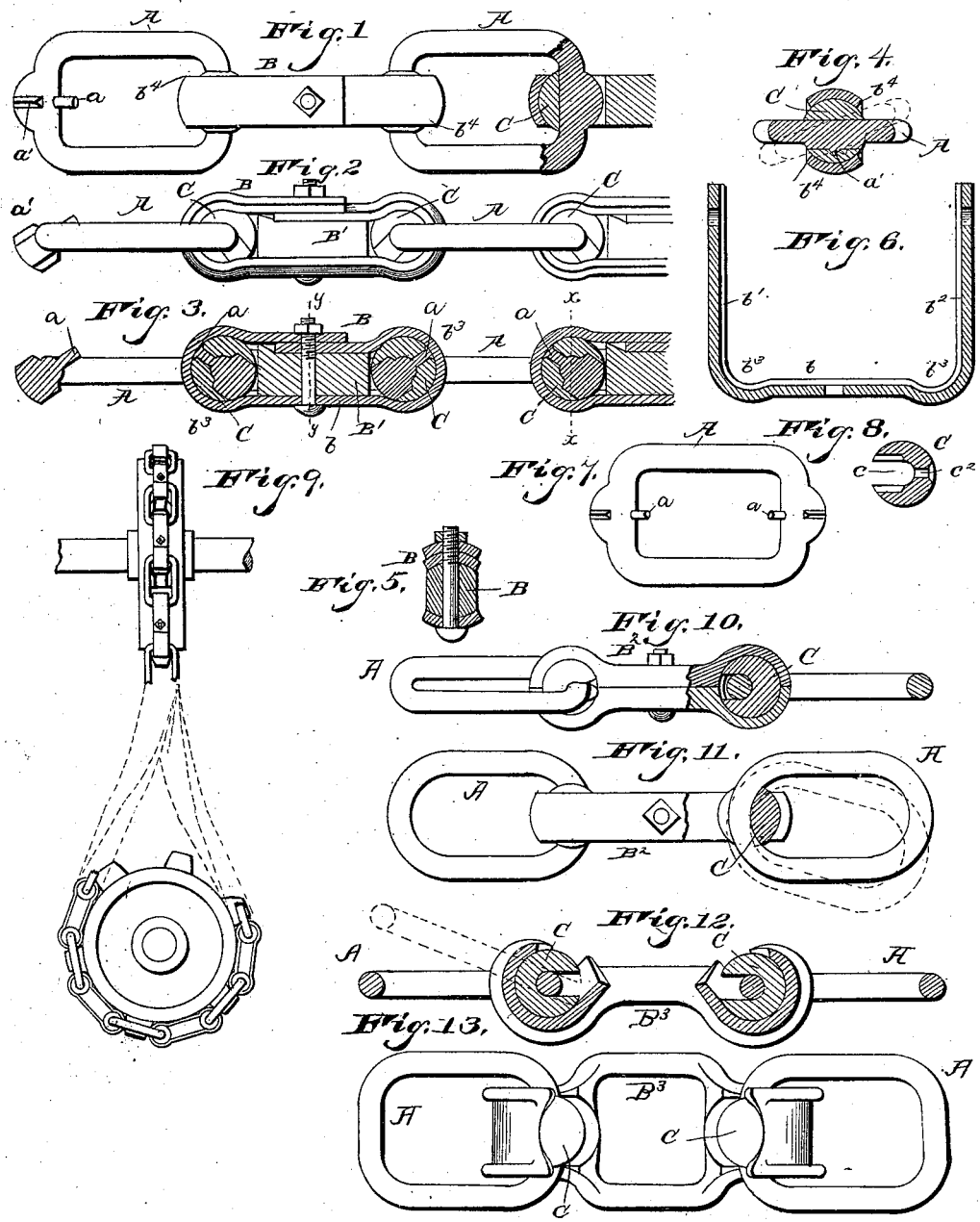
Witnesses
Marcus B May
J. C. Stier
Inventor
Lyman D. Howard
by
Doubleday & Blies
Attorneys

UNITED STATES PATENT OFFICE.

LYMAN D. HOWARD, OF PHILADELPHIA, PENNSYLVANIA, ASSIGNOR TO JOSEPH A. JEFFREY, OF COLUMBUS, OHIO.

CHAIN.

SPECIFICATION forming part of Letters Patent No. 574,906, dated January 12, 1897.

Application filed January 7, 1891. Serial No. 377,025. (No model.)

*To all whom it may concern:*

Be it known that I, LYMAN D. HOWARD, a citizen of the United States, residing at Philadelphia, in the county of Philadelphia and State of Pennsylvania, have invented certain new and useful Improvements in Sprocket-Chains, of which the following is a specification, reference being had therein to the accompanying drawings.

Figure 1 is a plan view of a portion of a chain embodying my invention. Fig. 2 is a side or edge view of the same. Fig. 3 is a longitudinal central section. Fig. 4 is a transverse section on the line $x\,x$, Fig. 3. Fig. 5 is a transverse section on the line $y\,y$, Fig. 3. Fig. 6 shows a coupling device detached. Fig. 7 shows one of the links. Fig. 8 shows one of the bushings detached. Fig. 9 shows the manner of connecting two shafts at an angle to each other by means of my improved chain. Figs. 10 and 11 illustrate a form of chain having somewhat modified parts. Figs. 12 and 13 illustrate another modification.

In the drawings, A represents a link of the sort that I prefer to use in constructing chains such as this case refers to. As shown in Figs. 1 and 2, it is a link differing somewhat from those in use in the old and common forms of chain. In the construction shown in said figures the end bar of each link is provided with a projecting piece or pin $a$. The old form of chain also had the links so arranged as to alternate with each other in position, that is to say, each link lies in a plane at right angles to that of the adjacent links. Such chains are not adapted for many of the uses to which one of the sort herein illustrated can be applied. The extent of surface at the place of articulation is so limited that there is a rapid wearing away of the metal, so that they cannot be readily used as drive-chains. Again, it is much more desirable to have a flat chain for the purpose of transmitting power, that is to say, one in which all of the links and the connecting devices shall lie in substantially the same plane, which plane is parallel to the axes from which motion is derived and around which the driven wheel or shaft revolves. In the chain herein illustrated all of the parts are so arranged in respect to said planes. The links A A being made of wrought bar metal possess the great strength relative to the weight incident to such links. I connect them by a joining device which, as a whole, is indicated at B. As shown in Fig. 3, this comprises a wrought-metal bar having the central connecting part $b$, the end portions $b'\,b^2$, and the sockets or eyes $b^3$, and in conjunction therewith a central bearing or thrust piece B'. The latter may be made of metal, although in the chains of the larger sizes use may be made of blocks of suitably-hard wood. In the sockets $b^3$ are placed ball-shaped bushings C, the sockets having flanges, turned edges, or projections at $b^4$ adapted to retain the bushings in place. Each bushing C has a slot or groove formed therein at $c$ of such width as to admit the entrance of a link A. The link may be loose in the socket or may be secured tightly to the bushing. The slot $c$ is preferably so inclined to the plane of the link A when in working position that the opening at the periphery of the bushing will not be adjacent to that part of the wall of the socket $b^3$ which receives the thrust of the link. By providing a bushing of this sort it will be seen that not only is there such freedom of articulation that the parts of the chain can readily adapt themselves to the required positions when it is being used in the ordinary way, that is to say, used for connecting two bodies revolving about parallel axes, but also can so move relatively to each other at the places of articulation that the chain can be used to connect wheels or shafts which are inclined to each other.

In Fig. 9 two shafts are shown at right angles to each other and at a short distance apart, but which can be readily connected by a chain of this sort, so as to have power transmitted from one to the other.

In Figs. 1 to 7 the link is shown as having a pin or equivalent device $a$, formed with or secured to it, and the bushing has an aperture at $c^2$ in which the said pin can be fitted, the latter initially projecting far enough through the aperture to permit a rivet-head to be formed.

The parts B B of the chain may be considered as links as well as couplers for the parts A A, though in respect to the wheels they may be either active or inactive. The wheels may be formed with alternate single and double or split teeth, in which case the parts B can also be readily used for driving.

In Fig. 12 a centrally-opening connecting device or link B' is shown adapted to fit the teeth of a wheel, and the bushing C' is not provided with a passage $c^2$, as in Figs. 1 to 7, the link being similar to those in the old and common forms of chain.

In Figs. 10 and 11 a form is shown in which the connecting-piece $B^2$ is made in two parts, each having more or less of the socket at the end and both being adapted to be fastened together to hold the links A' and bushings C' in place.

By having the ball-like bushings or expansions C slotted and the end bars of the links A seated in the slots provision is made for at any time, as after the occurrence of wear, removing any one of the balls and applying another. Even when the pins $a$ are used and their ends upset they can be detached in such way as to permit the withdrawal of a ball and the application of another.

By examining the drawings it will be seen that the walls of the partly-spherical socket on the connecting part B are narrower than the diameter of the ball, so that any link A can rock not only bodily downward and upward, (that is, relatively to the plane of the chain,) but also can rock laterally, and again can rock around a line which is longitudinal of the chain.

What I claim is—

1. In a chain, the combination with a link, A, of a separately-formed ball-like attachment, C, having a slot wherein the end bar of the link is detachably seated, said ball and end bar being arranged substantially as set forth whereby the link and ball are caused to rock together around lines transverse to the chain, and the connecting device, B, having a partly-spherical socket at its ends to receive the said ball, said socket being narrower than the diameter of the ball, whereby lateral flexion of the link, A, is permitted as well as vertical vibration, substantially as set forth.

2. In a chain, the combination with the links, A, A, having ball-like extensions connected to their end bars, of an intermediate coupler, B, formed with partly-spherical cavities in the ends adapted to fit said ball-like expansions, the width of the walls of the socket parts being less than the diameter of said balls, whereby the coupler can rock transversely as well as longitudinally, said coupler having a top longitudinal bar and a bottom longitudinal bar, and a bolt connecting said bars, substantially as set forth.

3. In a chain, the combination with the links, A, A, having ball-like expansions, C, C, on their end bars, of the intermediate coupler formed of a bar curved to have the sockets, $b$, concave transversely and concave longitudinally, and bent to provide upper and lower longitudinal bars with overlapping ends secured together after bending, substantially as set forth.

4. A chain having the wrought bar-links A, A, the link or connecting device B, and the ball-shaped bushings C, C, each adapted to be detachably connected to and rock with one of the said links in relation to the other, substantially as set forth.

5. In a chain, the combination with two adjacent links, of a connecting device provided near its ends with suitable sockets, ball-shaped bushings fitted in said sockets and adapted to be detachably connected with the adjacent end bars of the chain-links, and a thrust-piece interposed between said ball-and-socket joints in the connecting device, substantially as set forth.

In testimony whereof I affix my signature in presence of two witnesses.

LYMAN D. HOWARD.

Witnesses:
CHARLES W. MILLER,
WILLIAM F. GARRETT.